United States Patent [19]

Piacentini

[11] Patent Number: 5,106,113
[45] Date of Patent: Apr. 21, 1992

[54] WHEEL SUPPORT STRUCTURE FOR A CART

[76] Inventor: Giovanni Piacentini, Jonasborgsvägen 36, S-723 41 Västerås, Sweden

[21] Appl. No.: 678,290
[22] PCT Filed: Oct. 2, 1989
[86] PCT No.: PCT/SE89/00537
  § 371 Date: Apr. 3, 1991
  § 102(e) Date: Apr. 3, 1991
[87] PCT Pub. No.: WO90/03907
  PCT Pub. Date: Apr. 19, 1990

[30] Foreign Application Priority Data

Oct. 7, 1988 [SE] Sweden .................. 8803572

[51] Int. Cl.$^5$ .................. B62B 1/20; B62B 3/02
[52] U.S. Cl. .................. 280/47.21; 280/47.26; 280/47.33; 280/38; 280/653; 298/2; 298/5; 301/1; 301/7; 301/128
[58] Field of Search .......... 280/652, 653, 659, 43.15, 280/43.16, 38, 47.2, 47.21, 47.26, 47.31, 47.33; 180/906; 298/2, 5; 301/1, 7, 111, 114, 128, 131

[56] References Cited

U.S. PATENT DOCUMENTS

| | | | |
|---|---|---|---|
| 392,150 | 10/1888 | Fouzer | 280/47.31 X |
| 1,560,802 | 11/1925 | Julstedt | 180/906 X |
| 2,218,510 | 10/1940 | Albertson et al. | 180/906 X |
| 2,728,584 | 12/1955 | Brown | 280/659 X |
| 3,063,730 | 11/1962 | Domoradzki | 280/47.21 |
| 4,624,467 | 11/1986 | Burns | 280/652 X |
| 4,767,128 | 8/1988 | Terhune | 280/47.2 |
| 5,026,079 | 6/1991 | Donze et al. | 280/47.31 |

FOREIGN PATENT DOCUMENTS

| | | | |
|---|---|---|---|
| 256508 | 2/1913 | Fed. Rep. of Germany . | |
| 1216613 | 4/1960 | France | 280/47.26 |
| 78011582 | 1/1978 | Sweden . | |
| 1191347 | 11/1985 | U.S.S.R. | 280/653 |

Primary Examiner—Andres Kashnikow
Assistant Examiner—Brian L. Johnson
Attorney, Agent, or Firm—Eckert Seamans Cherin & Mellott

[57] ABSTRACT

A wheel support structure for a cart, such as a wheelbarrow. The structure includes two separate wheel axis each carrying a wheel. Each wheel axis is mounted on a holding arm, which is pivotable 180 degrees about a vertical frame portion, whereby the pair of wheels can be shifted between inner and outer positions. Upper and lower plate members, forming bearing flange members, are fastened to the vertical frame portion and to a vertical stud portion of the holding arm, respectively, and are selectively securable to each other in order to lock the associated wheel in the respective inner or outer position.

4 Claims, 3 Drawing Sheets

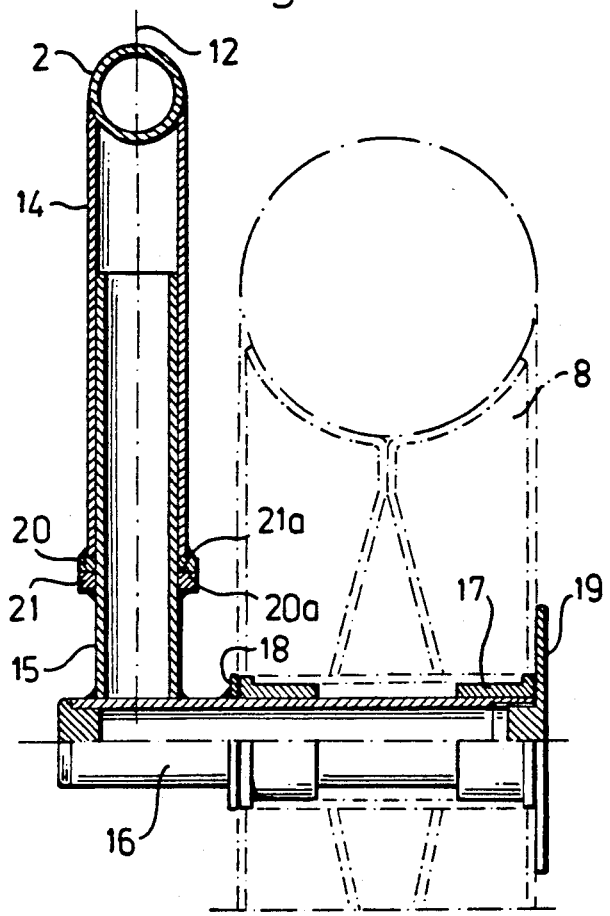
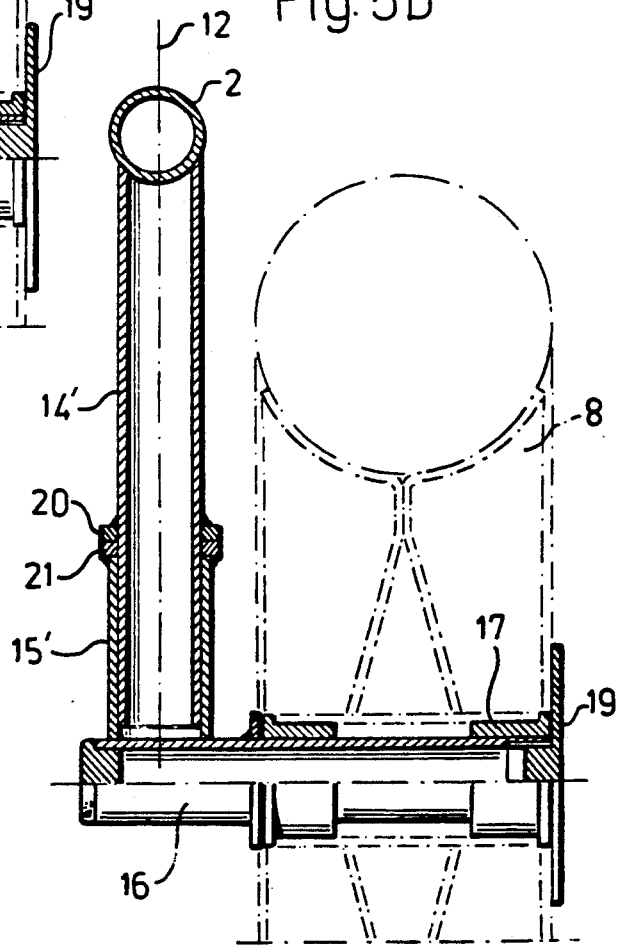

WHEEL SUPPORT STRUCTURE FOR A CART

BACKGROUND OF THE INVENTION

1. Field of the Invention

The present invention relates to a wheel support structure for a cart, e.g. for a wheelbarrow, having a supporting frame, the wheel structure comprising two separate wheel axes each carrying a wheel, each wheel axis being mounted on a holding arm, which is pivotable about a substantially vertical frame portion for pivoting 180° in a horizontal plane so as to enable selective positioning of each wheel in either an inner or an outer position relative to the longitudinal central plane of the cart.

2. Description of the Related Art

A similar wheel support structure is previously known from U.S. Pat. No. 2,728,584. In the known structure, the pair of wheels are mounted in such a way that, in a first, inner position, the two wheels are located below the front end of the load container of the cart for use as a conventional wheelbarrow to be pushed in a forward direction and, in a second, outer position, the two wheels are located below the rear half of the load container for use as a cart to be pulled in the opposite, backward direction, wherein two handle rods are swung inwardly towards each other so as to form a combined pulling rod. When converting the wheelbarrow into a pulling cart or vice versa, a pair of nuts inside the load container have to be loosened, whereupon the wheelbarrow is turned upside down to enable swinging of the holding arms carrying the wheels into the other position. Thereupon, the nuts inside the load container must be tightened again.

Another example of prior art is disclosed in the published Swedish patent application 7801158-2, wherein a wheel support structure corresponding to the opening paragraph is suggested (but not described in detail) at the end of the description.

SUMMARY OF THE INVENTION

On the basis of this prior art, the object of the present invention is to provide a wheel support structure, wherein a pair of wheels can be easily shifted between inner and outer positions, even if cart is loaded, and wherein each wheel is securely held in a well-defined inner or outer position upon shifting the wheel positions and locking the respective holding arm in a rigid position by means of a locking device.

This object is accomplished by the features as set forth. Thus, each wheel can be easily swung into a respective inner or outer position while making rolling contact with the ground, whereby the cart does not necessarily have to be unloaded before shifting the wheel positions. The outer position of a wheel pair will provide a good lateral stability when rolling the cart, whereas shifting to the inner position makes it possible to roll the wheelbarrow over rather narrow bridges, planks or the like. Therefore, the cart is flexible and safe in use. Furthermore, by means of the extended plate members forming bearing flange surfaces and being selectively securable to each other and to the supporting frame at a rear location, each holding arm is securably lockable in the respective position, whereby oscillation of each wheel is avoided.

In particular, the embodiment defined will give the further advantage that a pair of rear support members of the frame (conventionally serving to support the cart in a substantially horizontal rest position) can be replaced by a pair of rear wheels mounted in the same way as the first pair of wheels.

BRIEF DESCRIPTION OF THE DRAWINGS

The invention will be explained further below with reference to the appended drawings illustrating a preferred embodiment with two alternative wheel support structures.

FIGS. 5a and 5b show, in a larger scale, two alternative embodiments of the wheel support structure for one of the two wheels of the wheelbarrow.

DESCRIPTION OF THE PREFERRED EMBODIMENTS

Figure 1:
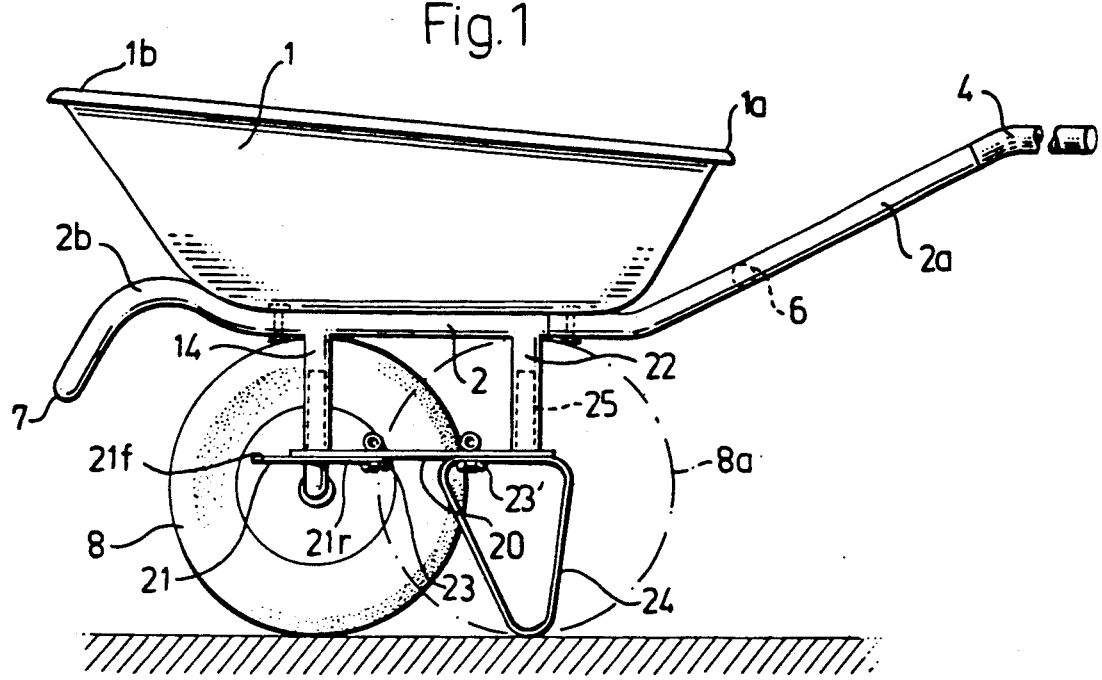
FIG. 1 is a side view of a cart, namely a wheelbarrow, in a horizontal rest position.
Figure 2:
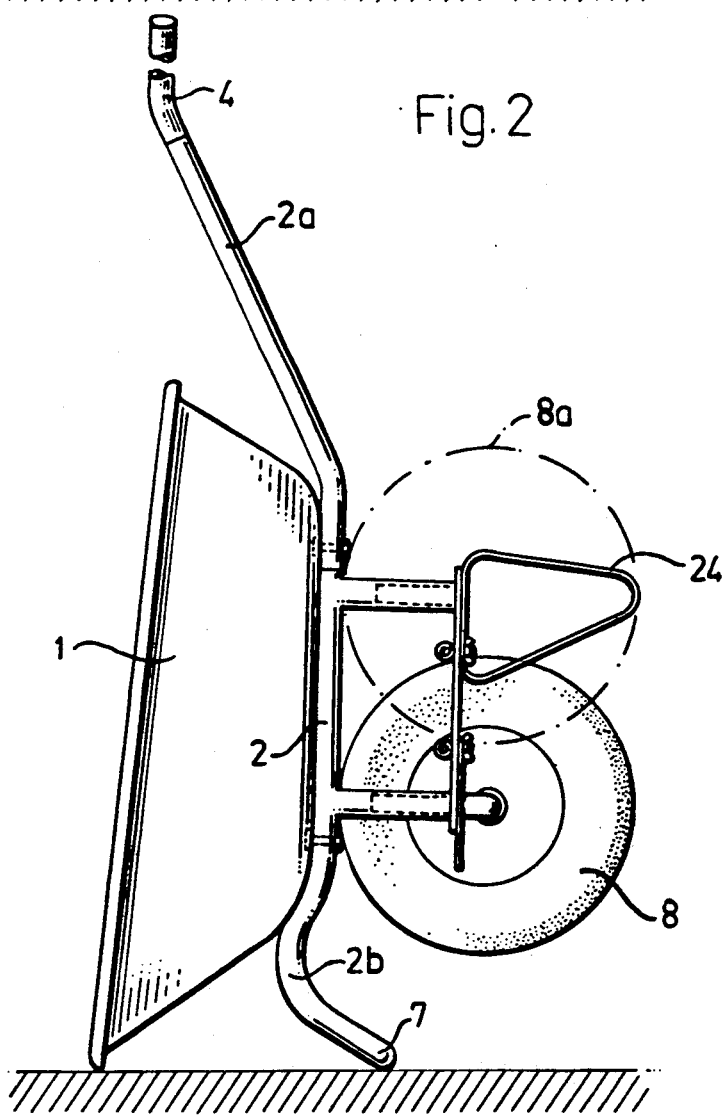
FIG. 2 is a side view of the wheelbarrow in a vertical rest position.
Figure 3:
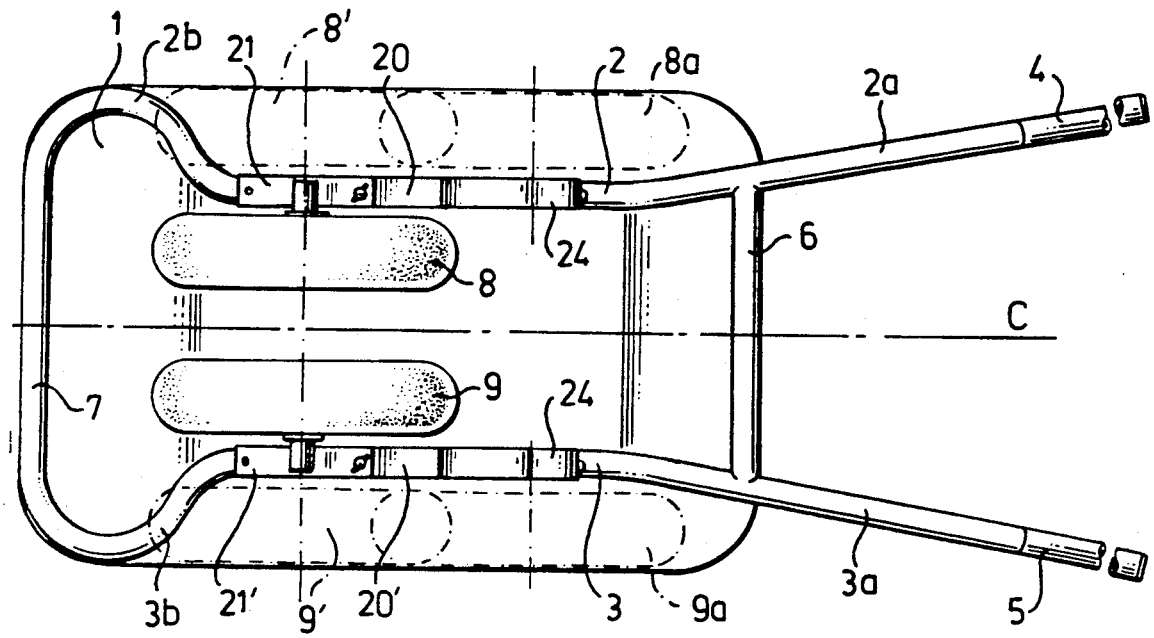
FIG. 3 shows the wheelbarrow from underneath.

The wheelbarrow shown in FIGS. 1-4 comprises a load container 1 made of a suitable rigid and resistant material, e.g. a metallic plate material, and a frame, which supports the load container and is integral with a wheel support structure.

The frame structure is preferably made of tubular members, e.g. of plated steel or aluminium, and comprises two longitudinal side members 2, 3 (see FIG. 3) which are extended rearwardly into slightly outwardly projecting rear portions 2a, 3a provided with handles 4, 5. The rear portions 2a, 3a are connected by a rear, transversal frame member 6 pernamently fastened e.g. by welding.

The side members 2, 3 of the frame structure extend mutually in parallel at each side of the longitudinal central plane C (FIG. 3) of the wheelbarrow. The front ends of the side members 2, 3, located approximately at a distance of one third of the length of the load container, from the front end thereof, are integrally extended into a connecting frame member including upwardly and transversally outwardly curved side portions 2b and 3b, respectively, and a transversal front portion 7, which is located at a lower level (in the horizontal rest position of FIG. 1) than the side portions 2b, 3b. It will be seen from FIG. 3 that the connecting front frame member 2b, 3b, 7 has a configuration substantially corresponding to the contour of the load container 1 below the front end portion 1b thereof, whereas the rear transversal frame element 6 is located substantially underneath the rear end portion 1a of the load container (compare also FIG. 1). Hereby, lifting hooks (not shown) can easily be hooked onto the respective front side portions 2b, 3b and the rear frame member 6 (or at the rearwardly extending portions 2a, 3a adjacent to the rear frame member 6) so as to conveniently lift the wheelbarrow safely in its frame. Moreover, the transversal front portion 7 serves as an abutment (as previously known per se) when forwardly tilting the wheelbarrow into the vertical rest position shown in FIG. 2.

According to the invention, the wheelbarrow is provided with at least on pair of wheels 8, 9 mounted in a special wheel support structure, which is integral with the frame structure. In particular (see FIG. 4), each wheel 8, 9 is mounted for free rotation on separate wheel axes 10 and 11, respectively, each of which is pivotable in a horizontal plane about a vertical pivot axis 12 and 13, respectively, so that each wheel 8, 9 can be shifted, by pivoting a respective holding arm forming an extension of each wheel axis, between an inner position 8, 9 (fully drawn) and an outer position 8', 9' (dash-dotted lines), these positions being located along a transverse imaginary line L which is perpendicular to the central longitudinal plane C of the wheelbarrow. In both positions 8, 9 and 8', 9' the pair of wheels will support the frame slightly in front of the center of gravity of the (loaded or empty) wheelbarrow. The outer positions 8', 9' will give the wheelbarrow an excellent transversal stability, whereas the inner positions 8, 9 make it possible to roll the wheelbarrow on rather narrow bridges, planks or the like. Now, it is very easy to shift between the inner and outer positions of the pair of wheels by simply pivoting the holding arm with the respective wheel axis about the respective pivot axis 12, 13, even when the wheelbarrow is placed in its horizontal position (FIG. 1) and even when it is loaded. Moreover, the shifting is facilitated by the fact that the wheels make rolling contact with the ground during pivoting.

The wheel support structure for supporting the wheel 8 (the support structure for the other wheel 9 being identical and thereof not shown in detail) is illustrated in larger scale in FIG. 5a, whereas a slightly modified embodiment thereof is shown in FIG. 5b.

Referring to FIG. 5a, there is shown a tubular frame portion 14 fastened by welding to and projecting vertically downwards from the frame side member 2 along the pivot axis 12. At the inside of the tubular frame portion 14, a tubular stud 15 is rotatably journalled so as to permit rotation thereof about the pivot axis 12. At its lower end, the stud 15 is fastened by welding to the above-mentioned, horizontally extending holding arm 16, which is likewise tubular and constitutes the wheel axis or shaft 10 at its outer, free end portion. The wheel 8 is provided with a hub 17, which is freely rotatable on the axis or shaft 10 between two lateral holding flanges 18 and 19 rigidly fastened to the shaft.

In order to hold the vertical stud 15 in a fixed vertical position relative to the vertical frame portion 14, the stud 15 and the frame portion 14 are fastened by welding to horizontal plate members 20 and 21, respectively, forming bearing flange surfaces 20a, 21a in the region of the stud 15 and the frame portion 14.

The embodiment of FIG. 5b differs from that of FIG. 5a only in that the vertical, tubular stud 15' is rotatably journalled at the outside of the vertical frame portion 14'.

Figure 4:
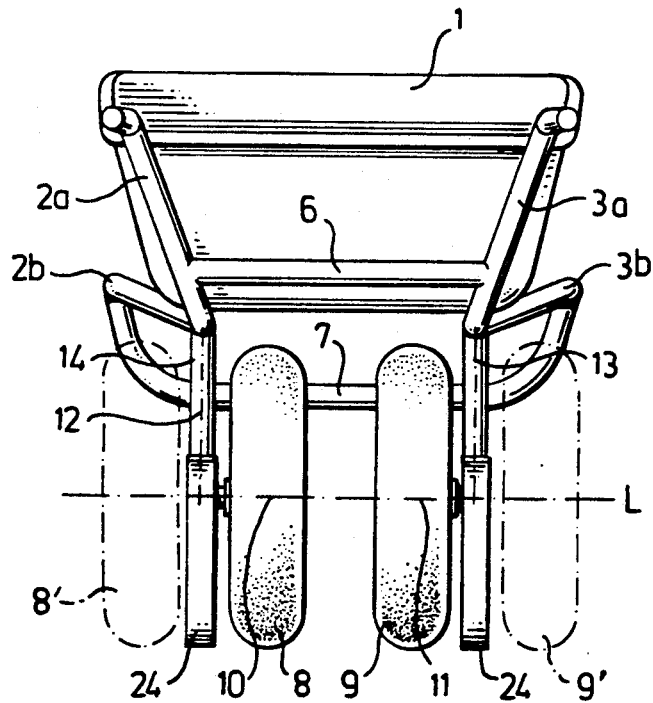
FIG. 4 is a rear end view of the wheelbarrow.

As illustrated in FIG. 1, the upper, horizontal plate member 20 is fastened to the vertical support portion 14 at its front end portion and extends longitudinally rearwardly to a similar, rear vertical frame portion 22, where it is likewise fastened by welding. Hereby, the upper horizontal plate member 20 (and the corresponding plate member 20' at the other side of the wheelbarrow, see FIG. 3) is securely and rigidly connected to the frame structure. The lower, horizontal plate member 21 (and 21' at the other side) is fastened to the stud 15 (see FIG. 5a) at its central portion and extends in opposite directions therefrom, so that either one of its free end portions 21f (forward), 21r (rear) can be positioned under and in line with the upper, rearwardly extending plate member 20. In either position, the lower, pivotable plate member 21 can be releasably secured to the upper, fixed plate member 20 by means of locking or fastening means 23, e.g. a pin through corresponding holes in the plates 20, 21 and a wing nut for securing the pin in its locking position. In the secured position, the stud 15 will be held in an exact angular position relative to the frame portion 14, so that the holding arm 16 with the wheel axis is likewise exactly positioned along the transversal line L (FIG. 4). Hereby, the wheels will not oscillate when rolling on the ground.

Two rear support members 24, each in the form of a plate element bent into a closed, triangular, elongated shape, are provided with vertical holding stud portions 25, each fitting into the respective rear vertical frame portion 22, and are secured to the upper, horizontal plate members 20, 20' by releasable locking or fastening means 23', e.g. identical to the means 23. The rear support memebers 24 are dimensioned so as to hold the wheelbarrow in a substantially horizontal rest position.

If desired, the rear support members 24 can be replaced by a pair of rear wheels 8a, 9a (illustrated by dash-dotted lines in FIGS. 1, 2 and 3), which are mounted in the same way as the front wheel 8, 9. Since the wheel diameter is greater than the distance between the front and rear frame portions 14, 22, one pair of wheels has to be placed in the inner position when the other pair is placed in the outer position, and vice versa. With such a wheel arrangement, preferably with the front wheels placed in the inner positions, the wheelbarrow can be pushed, without lifting in the handles 4, 5, on the ground where the supporting ground surface is wide enough, whereas the wheelbarrow can be rolled on the front wheels only, while lifting in the handles 4, 5, when passing over narrow passages, such as planks or the like.

In order to achieve the desired simple shifting between the outer and inner wheel positions, while securing a rolling contact with the ground, it is essential that the respective wheel axis 10, 11 extends in a horizontal plane perpendicular to the respective pivot axis 12 or 13. Hereby, the wheel will follow a circular path with its axis directed towards the pivot axis when the holding arm is swung around the pivot axis. However, the holding arm may be inclined and/or curved as long as the wheel axis extends in such a horizontal plane perpendicular to the pivot axis. As another feasable alternative, the holding arm may be secured to a fork-like bracket carrying the respective wheel axis. However, the illustrated embodiment with a rectilinear, rather short holding arm constituting an extension of the wheel axis seems to be the most practical one.

The wheel support structure described above may be modified within the scope of the appended claims, e.g. as regards the frame structure and the wheel holding arms. Also, the locking of the respective holding arm in each transversal position may be achieved by other means, e.g. by snap locking means, or fastening means without loose parts.

I claim:

1. A wheel support structure for a cart having a supporting frame, the wheel support structure comprising two separate wheel axes (10, 11) each carrying a wheel (8, 9), each wheel axis being mounted on a holding arm (16) which is pivotable about a substantially vertical frame portion (14) pivoting 180° in a horizontal plane so as to enable selective positioning of each wheel in either one of an inner and an outer position (8, 8', 9, 9') relative to the longitudinal central plane (C) of the cart, characterized in that:

(a) each pivotable holding arm (16) is securely connected to a vertical stud portion (15), which is rotatably journalled at said vertical frame portion (14);

(b) upper and lower plate members (20, 21), forming bearing flange surfaces, are fastened to said frame portion (14) and to said stud portion (15), respectively, said upper plate member (20) extending backwards from said frame portion (14) and being securely connected to the supporting frame at a rear location (22) whereas the lower plate member (21) extends in opposite longitudinal directions from said stud portion (15) and includes opposite end portions (21f, 21r); and (c) each end portion (21f, 21r) of the lower plate member (21) is selectively securable to the upper plate member (20) by releasable fastening means (23) upon swinging the holding arm (16) and an associated wheel to one of the respective inner and outer positions.

2. A wheel support structure as defined in claim 1, characterized in that said vertical frame portion (14) is tubular and in that said stud portion (15) is rotatably journalled inside tubular frame portion (14).

3. A wheel support structure as defined in claim 1, characterized in that said stud portion (15') is tubular and is rotatably journalled outside of said vertical frame portion (14').

4. A wheel support structure as defined in any one of the preceding claims, characterized in that one pair of wheels (8, 9) is mounted in a front part of the cart, wherein a rear pair of vertical portions (22) of said frame are adapted to accomodate either one of a pair of stud portions with associated holding arms and associated rear wheels and a pair of stud portions (25) connected to associated support members (24) dimensioned to support the rear part of the cart on the ground so as to hold the cart in a substantially horizontal rest position.

* * * * *